United States Patent [19]

Krishnan

[11] Patent Number: 4,988,852
[45] Date of Patent: Jan. 29, 1991

[54] BAR CODE READER

[75] Inventor: Kalyan V. Krishnan, Fremont, Calif.

[73] Assignee: Teknekron Transportation Systems, Inc., Berkeley, Calif.

[21] Appl. No.: 496,167

[22] Filed: Mar. 19, 1990

Related U.S. Application Data

[63] Continuation of Ser. No. 215,110, Jul. 5, 1988, abandoned.

[51] Int. Cl.⁵ .............................................. G06K 7/10
[52] U.S. Cl. ................................... 235/462; 235/472; 235/494
[58] Field of Search ............... 235/463, 462, 472, 494; 382/12, 48

[56] References Cited

U.S. PATENT DOCUMENTS

| | | | |
|---|---|---|---|
| 4,329,574 | 5/1982 | Jordan, Jr. | 235/463 |
| 4,411,016 | 10/1983 | Wakeland | 382/62 |
| 4,514,622 | 4/1985 | Wevelsiep | 382/12 |
| 4,646,353 | 2/1987 | Tange | 382/12 |
| 4,696,049 | 9/1987 | Musso | 382/48 |
| 4,704,519 | 11/1987 | Kulikauskas | 235/494 |

*Primary Examiner*—Harold Pitts
*Attorney, Agent, or Firm*—Townsend and Townsend

[57] ABSTRACT

A system for finding and reading a bar code, arbitrarily located on a document, working from an electronic image of the document represented by a pixel array such as generated by a document scanner. A one-dimensional texture analysis is performed in the scanning direction by defining a pattern of test segments and searching for characteristic ranges of transistions within those test segments. If a horizontal test segment pattern fails to locate a bar code region, a test segment pattern skewed with respect to the horizontal is applied. If test patterns skewed with respect to the horizontal fail to locate a bar code region, then a state-transition analysis is applied in the direction perpendicular to the scan direction and in directions skewed with respect to that perpendicular to search for a terminal symbol characterizing the bar code.

11 Claims, 2 Drawing Sheets

Microfiche Appendix Included
(1 Microfiche, 83 Pages)

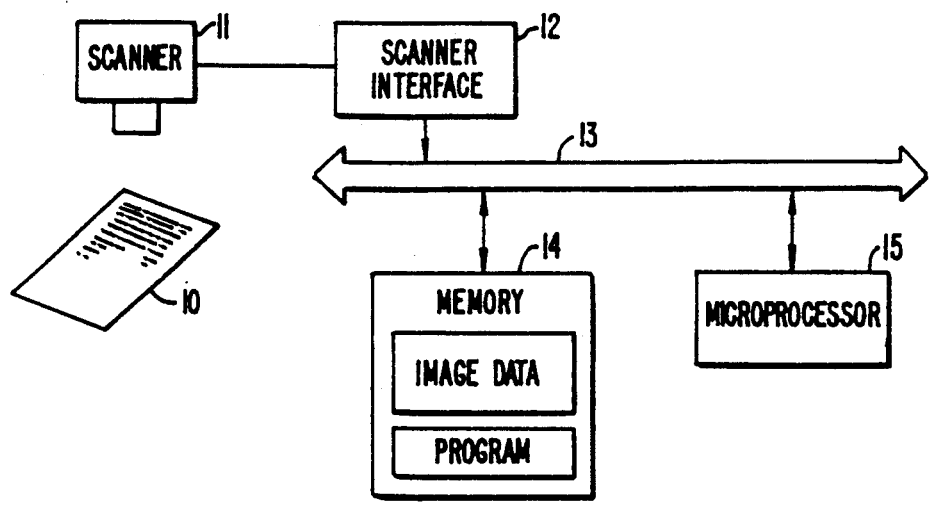
FIG._1.
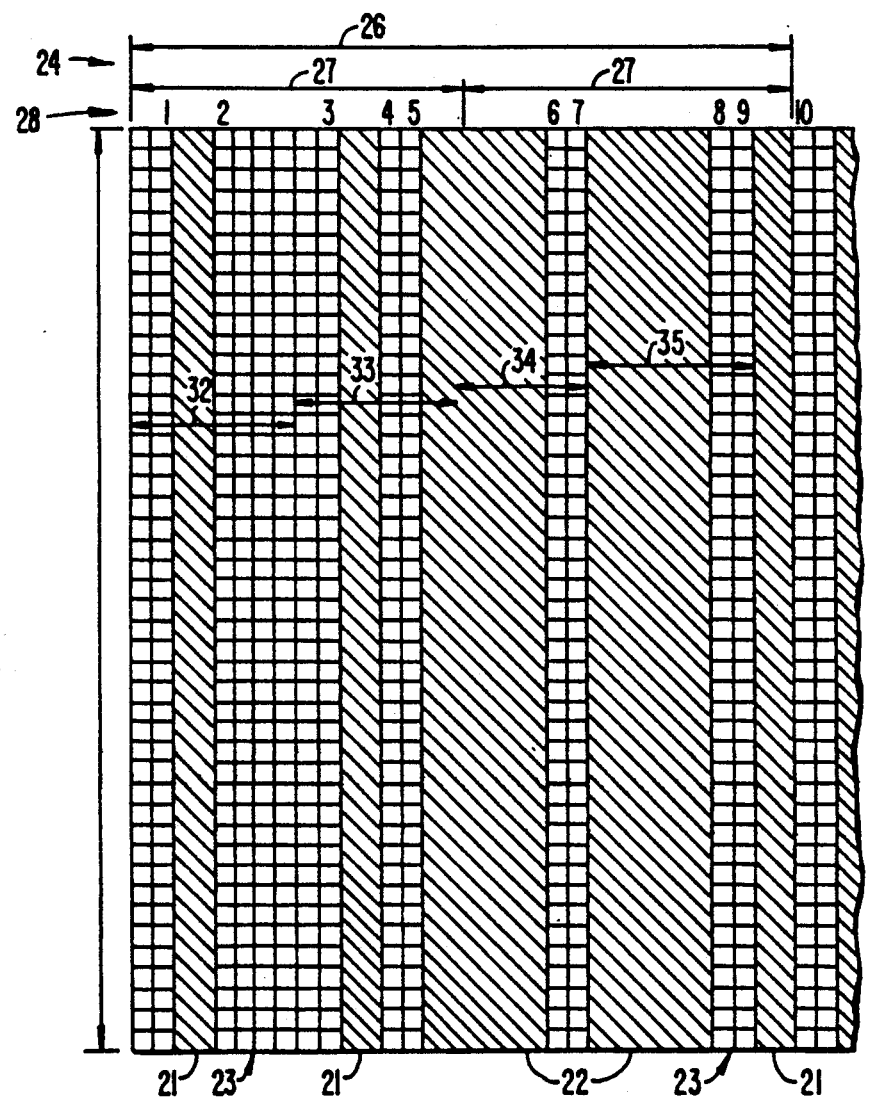
FIG._2.

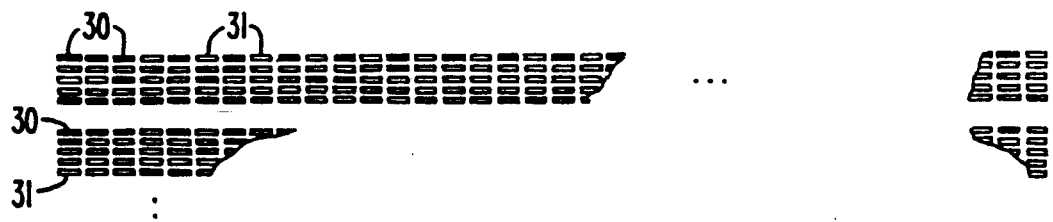
FIG._3.
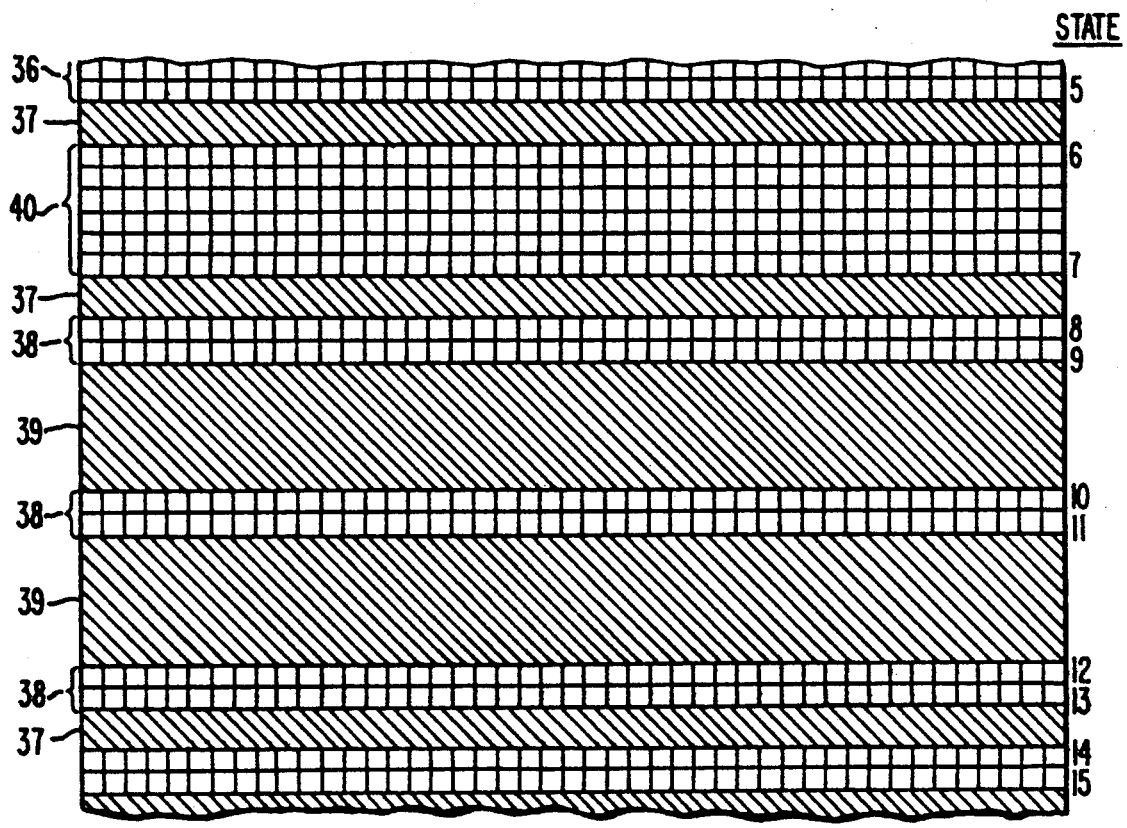
FIG._4.

BAR CODE READER

This is a continuation of application Ser. No. 07/215,110, filed July 5, 1988, now abandoned.

This specification includes a microfiche appendix containing a total of one fiche and 83 frames.

BACKGROUND OF THE INVENTION

The present invention relates generally to apparatus for reading bar codes or similar codes and more specifically to techniques for distinguishing the code from other data or markings.

A bar code is a pattern of bars of various widths or heights used to encode information. Bar codes are familiar from supermarkets and other retail stores, where they are commonly placed on the packaging, containers, or sales tags for items being sold to encode the price and other information about the items. They are also used by the Postal Service, where they are applied to envelopes to encode the zip code. The bar codes assist greatly in the processing of these items because they can be quickly scanned and automatically decoded—in the above examples, for registering the price of the transaction or for routing the mail.

Known bar code readers require that the location of the bar code be determined prior to scanning. At an automated checkstand, for example, the location of the bar code is determined by the cashier, who then moves it past a fixed scanner or, alternatively, may pass a hand-held scanning wand directly over the bar code. In the post office, the bar code is placed on the envelopes in a predetermined location or field of limited extent, and the scanner is configured to extract only that location or field.

Besides automatic bar code detection, other approaches have also been developed to facilitate high volume and/or high speed processing of documents. One such approach is image processing, by which electronic images of entire documents are captured and stored in computer memory, and the desired information is extracted from the electronic images rather than from the paper documents themselves.

At present, automatic bar code detection and reading techniques cannot be readily combined with full-document image processing for automatically reading a bar code from a full-document image, unless the bar code is known in advance to lie within a predetermined field of limited extent and known position and orientation on the document. A typical image of an 8½ by 11 inch document may contain about 500 Kbytes of pixel data, while the image of a bar code appearing on the document may require only about 2 Kbytes. Thus, the bar code image will be submerged in a sea of other pixel data.

SUMMARY OF THE INVENTION

The present invention provides a technique for automatically determining the presence, location, and orientation of a bar code or similar code arbitrarily positioned on a document, working with the electronic image of the document.

The electronic image is generally generated by scanning the document so as to produce a pixel array, which is retained in the system memory. According to the invention, a region containing a candidate bar code is first automatically located within the pixel array for the entire document image by determining both its position and approximate orientation. A base line of the candidate bar code is then defined, which runs generally along an edge of the bar code region and perpendicular to the individual bars comprising the code. The bar is then decoded in the direction defined by the base line.

The pixel data will be stored in the system memory in a predetermined direction, determined by the initial scan direction. In one aspect of the invention, the candidate bar code may be located by performing a texture analysis in search of bar code texture. A pattern of segments is defined within the pixel array, which initially lie in the predetermined direction, in which the pixel data are accessed. The number of transitions from black to white or white to black pixels is counted within each segment of the pattern, and the transition counts are then compared with predetermined ranges of transition counts which are characteristic of bar codes.

If no candidate bar code region is found after the pattern of segments is applied across the entire pixel array in the predetermined direction, then the pattern of segments is applied again at a tilted orientation, and the number of transitions is again counted and compared with the predetermined characteristic ranges.

According to the invention, bar codes which are oriented generally perpendicular to the predetermined direction may be searched for more efficiently using a state-transition method. According to this method, successions of pixels from the pixel array, in a direction generally perpendicular to the scan direction, are compared with successions of states which are characteristic of a terminal symbol appearing at the beginning and/or end of the bar code. When the state-transition analysis fails to locate a candidate bar code with generally perpendicular successions of pixels, then the analysis may be repeated again with successions of pixels skewed with respect to the perpendicular direction.

Other aspects, advantages and novel features of the invention are described hereinbelow or will be readily apparent to those skilled in the art from the following specifications and drawings of an illustrative embodiment.

BRIEF DESCRIPTION OF THE DRAWINGS

FIG. 1 is an overall block diagram of apparatus incorporating the present invention.

FIG. 2 shows a portion of a horizontally oriented bar code together with a pattern of segments used in texture analysis, FIG. 3 shows a periodic pattern for selective application of the texture analysis.

FIG. 4 shows a portion of a vertically oriented bar code and corresponding states used in state-transition analysis.

DETAILED DESCRIPTION OF A PREFERRED EMBODIMENT

For purposes of illustration, the invention is described as implemented in a microcomputer system associated with a document scanner such as shown in FIG. 1. A document 10 containing a bar code in an unspecified location is scanned by scanner 11, which captures an image of the entire document. The bar code image, of course, will be buried in the image of any other text, graphics or stray markings appearing on the document. Through scanner interface 12' and, if desired, other circuitry for enhancing the image, a pixel representation of the document 10 is provided to the system memory 14 under the control of the microprocessor 15.

In a typical installation the scanned documents may assume a variety of sizes, but will frequently include the standard 8½ by 11 inch office paper. With a scanner resolution of 200 pixels per inch (a relatively low resolution). an 8½ by 11 inch document image contains about 500 Kbytes of pixel data. With the same resolution a horizontal 3-of-9 type bar code typically occupies about 45 scan lines and extends a length of about 352 pixels and, thus, contains only about 2 Kbytes of information.

In the specific embodiment disclosed her, the document image is assumed to be scanned into memory in raster form. Means for scanning the document and for storing and enhancing the image under control of the microprocessor are entirely conventional and will be understood by those skilled in the art without need of further description herein. The present invention operates on the pixel representation of the captured image stored in memory to determine the presence, location, and orientation of a bar code (or like code) so that the bar code may automatically be decoded without the intervention of a human operator. In the embodiment illustrated here the invention is implemented through software, which is schematically represented by the program block depicted within memory 14.

The microfiche appendix to this specification contains a specific embodiment of a C language program which was devised for use in the trucking industry. The trucking industry keeps track of freight shipments and associated documentation through a system of number, referred to as "progressive" numbers, or "pro" numbers for short. The truckers who first pick up the freight from the shippers typically carry adhesive labels or stickers bearing sequential pro numbers. On receiving the freight, the trucker applies a pro number sticker to the freight and duplicate pro number stickers to the bill of lading and its multiple copies. The pro number serves to identify the transaction and index the documents. The pro number sticker may be applied to any clear spot on the bill of lading. Because of the variety of preprinted bill of lading forms and the variation in which individual forms may be filled out, the pro number stickers will be found in unpredictable locations and orientations. In the past when processing the bills of lading, even with computer-assisted processing systems. it has been necessary for a human operator to read each bill of lading to find the pro number and enter it into the computer data base. Bar-coded pro number stickers would aid in processing the pro numbers, except that some of the advantages of bar coded stickers are lost when combined with a full-document image processing system because an operator still has to intervene to find the bar code and perform the keystrokes to initiate reading.

As illustrated in the program in the appendix, two one-dimensional approaches are used to search for the presence, location, and orientation of the bar code. The first, referred to as texture analysis because it locates a candidate region in which the image has the general "feel" of a bar code, is particularly adapted to searching for bar codes oriented generally in the same direction as the image data are sequentially accessed in memory. The second approach, referred to as state-transition analysis, is better adapted to searching for bar codes which are oriented generally perpendicular to the direction the image data are accessed. As used herein, the orientation of a bar code refers to the direction in which the bar code is read, which will be perpendicular to the direction of the individual bars. In the present embodiment, the image data are stored and accessed in the direction of the raster, which provides a natural reference defining a horizontal direction. The texture-analysis technique is especially fast and efficient in locating bar codes which lie generally in this direction.

Texture analysis will now be described with reference to FIG. 2, which shows a portion of a horizontally oriented bar code. The horizontal direction coincides with the predetermined scanning direction, which is taken to be the direction in which the pixel array data are accessed in memory 14. The bar code of FIG. 2 is composed of an arrangement of narrow bars 21. having a width of two pixels, and wide bars 22, having a width of six pixels. (Each pixel is represented by a square of the gridwork 23.) The texture-analysis technique examines the transitions from black to white and white to black pixels occurring in a limited region of the image to determine whether the variation in the number of such transitions over the limited region, i.e., the variation in the density of transitions throughout the region, is characteristic of a bar code. Such regions having the characteristic numbers of transitions are candidates for containing a bar code.

To determine the number of transitions, a pattern of "test" segments is defined, in which the transitions are counted. The test segments will generally be of different lengths, although this is not necessary, and some segments will generally overlap one another or form subsegments of other segments. For example, in FIG. 2 the pattern of segments is provided by the nested arrangement indicated at 24, which is composed of a first segment 26, thirty-two bits wide, and two contiguous subsegments 27, each sixteen bits wide.

It has been observed that a 3-of-9 type bar code having the above pixel widths will exhibit a characteristic range of seven to eleven transitions in a 32-pixel wide segment and will exhibit a characteristic range of two to seven transitions in each 16-pixel wide subsegment. In the texture-analysis approach, the number of transitions is determined within each of the defined segments making up the pattern, and the transitions so found are compared with the characteristic ranges.

The transition counts exhibited by the bar code of FIG. 2 are indicated at reference numeral 28. It is seen that the first segment 26 includes ten transitions, and the two subsegments 27 each include five transitions. These "measured" transition densities fall within the characteristic bar code ranges. At this stage, then, the texture analysis indicates that at least the 32-pixel wide portion of the scan line under examination belongs to a candidate region.

While other patterns of test segments could also be used with the bar codes of FIG. 2, the illustrated pattern is advantageous in that the count for the supersegment 26 can be determined simply by adding the counts for the two subsegments 27, rather than by an independent counting operation. Thus the illustrated pattern yields a savings in execution time.

FIG. 2 depicts an ideal bar code, displaying no irregularities or deviations in the vertical direction. As applied to FIG. 2, then, the test segment pattern will yield the identical number of transitions per segment regardless of the particular scan line at which the pattern is placed, i.e., regardless of the vertical position at which the count is taken. In practice, however, the pixel representation will show deviations from an ideal bar code, which may be present in the bar code as it appeared on the original document or which may be introduced in processing the image or by the limited resolution of the scanner itself. Thus, some variation in the count will generally be observed at different vertical positions.

As a further verification that a bar code has been located in the candidate region, a number of vertically and horizontally adjacent portions of sequential scan lines are examined for bar code texture. In the example of FIG. 2 this is carried out by using an array of 32-bit numbers referred to as a freckle. Each 32-bit number in this array represents one scan line. Across each scan line a number of possible positions will be examined for bar code texture. (In the search technique disclosed more fully below there are 27 possible positions examined per scan line.) Individual bits of each long (four byte) integer in the freckle array correspond to the examined positions in the scan line. If the counting step determines that the first position has bar code texture, then the corresponding bit in the freckle array is set. To determine if adjacent portions exhibit bar code texture, providing further verification of the presence of a candidate region, the freckle entries corresponding to an appropriate number of rows may be logically ANDed together. The resulting quantity is examined to determine if the component bits are set, designating a vertically extending region with bar code texture. The routine of the microfiche appendix ANDs four consecutive rows together and looks for three adjacent bits set in the ANDed quantity, indicating a region with bar code texture three test patterns wide and 4 tested rows high.

To speed up the execution time for performing the texture analysis, not all scan lines are examined and within each scan line which is examined, not all positions are examined. For example, for the 3-of-9 bar code candidate regions have been adequately located by examining only every alternate 32-bit portion of a scan line (thereby reducing the number of loops of the texture-analysis routine by two) and by examining only every fifth scan line (thereby reducing the number of loops of the routine by a further factor of five). Thus, the pattern of test segments is selectively applied to the pixel array in a periodic fashion, as illustrated in FIG. 3 in which each rectangle represents a portion of the pixel array 32 bits wide and 1 bit high. The shaded rectangles 30 are subjected to texture analysis; the unshaded rectangles 31 are not. At 200 pixels per inch resolution, in the image of an 8½×11 inch document there are 54 such rectangles per scan line and 2.200 scan lines, giving a total of 118.800 rectangles. Thus, with the periodic examination pattern shown in FIG. 3, only 27 rectangles will be examined per scan line and a maximum of only 11.880 rectangles need be examined per 8½×11 inch document.

The texture-analysis technique has been described thus far as applied to an ideal horizontally oriented bar code. As just described, the technique will also locate bar codes which are slightly skewed from the horizontal. As the amount of the skew from the horizontal increases, the horizontal texture analysis may fail to detect a candidate bar code region. In the event no bar code is found, the texture analysis is repeated in skewed configuration. In the illustration of FIG. 2, for example, the test segment 26 is comprised of four co-linear bytes. For skewed texture analysis one or more of these four bytes may be offset from one another in the vertical direction by one or more rows. In this way, the test segment may be composed from bytes taken from different scan lines. For example, the bytes 32 and 33 in FIG. 2 form a first skewed subsegment, and bytes 34 and 35 form the second skewed subsegment. The bytes 32–35 taken together form the skewed "supersegment" corresponding to the horizontal segment 26. As the angle of skewness from the horizontal increase, byte-wise offsets within the skewed test segments may fail to find the candidate bar code region. In that event, the test segments may be constructed of offset blocks of pixels of smaller sizes, e.g., offset four-bit (or smaller) nibbles.

As the angle of skewness from the horizontal increases, the texture-analysis technique becomes less and less efficient, and consequently takes longer to locate a candidate bar code region. In the extreme case of a vertically oriented bar code, the skewed horizontal texture analysis is not at all suited to locating the candidate region. For example, in the illustration of FIG. 2, a 32-pixel wide segment 26 was defined in which to search for bar code texture. In the strictly horizontal orientation, only four consecutive bytes need be accessed and manipulated to define that segment. In the vertical direction, however, thirty-two non-consecutive bytes would have to be simultaneously accessed and manipulated to define a comparable test segment. For this reason, a state-transition analysis is used to search for bar codes which are oriented generally vertically. This analysis searches for the terminal symbol of the bar code (i.e., the starting symbol, or the ending symbol, in the event the bar code label is backwards). The state-transition analysis is fashioned after a classic Moore state machine having successive bytes from each vertical scan column as input and having an internal state indicating the progress toward detecting the beginning (ending) symbol.

For the 3-of-9 type bar code the terminal symbol is the bar code pattern representing an asterisk. The asterisk character begins with a leading quiet zone 36, which is followed by a sequence of narrow bars 37, narrow spaces 38, wide bars 39, and wide spaces 40 depicted in FIG. 4.

In the state-transition analysis, a progression of vertical columns is examined for the terminal symbol by means of a state-transition table, such as given in Table I.

TABLE I

| State | Description |
|---|---|
| 0 | Starting state |
| 1 | 8 white pixels found |
| 2 | 16 white pixels found |
| 3 | 24 white pixels found, minimum quiet zone |
| 4 | 32 white pixels found |
| 5 | 40 white pixels found, maximum quiet zone |
| 6 | First narrow bar |
| 7 | First space: if narrow, indicates a down-up oriented bar code; if wide, indicates an up-down oriented bar code, if borderline, examine second bar to determine orientation. |
| 8 | Second narrow bar, up-down orientation |
| 9 | Second narrow space, up-down orientation |
| 10 | Third wide bar, up-down orientation |
| 11 | Third narrow space, up-down orientation |
| 12 | Fourth wide bar, up-down orientation |
| 13 | Fourth narrow space, up-down orientation |
| 14 | Fifth narrow bar, up-down orientation |
| 15 | Trailing narrow space, up-down orientation |
| 16 | Second wide bar, down-up orientation |
| 17 | Second narrow space, down-up orientation |
| 18 | Third wide bar, down-up orientation |
| 19 | Third narrow space, down-up orientation |
| 20 | Fourth narrow bar, down-up orientation |
| 21 | Fourth wide space, down-up orientation |
| 22 | Fifth narrow bar, down-up orientation |
| 23 | Trailing narrow space, down-up orientation |

| | |
|---|---|
| 24 | Resolve ambiguity of state 7; if second bar is narrow, it is up-down oriented. |
| 30 | Bar code found, up-down orientation |
| 31 | Bar code found, down-up orientation |

The states 0, 1, 2, and 3 are attained upon detection of successive bytes of white pixels. Having reacted state 3 implies that at least 24 white pixels have been detected—the minimum quiet zone. States 4 and 5 also lie in the quite zone range. If more than 40 consecutive white pixels are found, the region is declared to be too wide to constitute a quite zone and a transition is made back to state 0. From state 3, 4, or 5, if a narrow (i.e., 1–3 pixels wide) is detected, then a transition is made to state 6. At state 6 a determination is made whether the bar code is oriented so as to read from top to bottom (up-down orientation) or from bottom to top (down-up orientation). If the subsequent space is narrow (1–3 pixels), the bar code is down-up candidate. If wide (5–7 pixels), it is an up-down candidate. If the space is detected to be exactly 4 pixels wide, then the status is considered to be ambiguous, and the machine jumps to state 24 to resolve the ambiguity. From that point on, if an up-down orientation was indicated at state 7 or 24. the states follow in the sequence 8-9-10-11-12-13-14-15-30. If a down-up orientation was indicated. the sequence of states is 16-17-18-19-20-21-22-23-31. Any error in detecting these states will cause the machine to return to state 0 until another minimum quiet zone is found.

To save further execution time in performing the vertical state-transition analysis, only selected vertical columns are subjected to the state-transition analysis. For example, it has been found adequate to examine only every third vertical column.

After a candidate bar code is located in the document image, a baseline is established with respect to which the bar code is read. The baseline is defined so as to run perpendicular to the individual bars of the bar code. Along any given baseline the bar code may be oriented rightside-up or upside-down. The baseline together with additional information signifying the direction in which the bar code is to be read, then enable the bar code to be decoded.

The baseline is defined as follows. After a candidate bar code region is located, a window is defined around the candidate region. As illustrated here, the window is large enough to include the entire bar code and so must have dimensions of at least 352 by 45 pixels. The image data within the window are then subjected to a rectification operation, which is labeled "RECT" in the C language program of the microfiche appendix. For a bar code in a generally vertical orientation, the RECT operation proceeds as follows. For each byte of data, the RECT operation sets all the component bits of the byte if six or more bits of actual image data are set: that is, after the RECT operation a byte will indicate that all the corresponding pixels are black if six or more corresponding pixels in the image data are black. For a bar code in a generally horizontal orientation, the RECT operation sets all the component bits of the byte if two or more bits of the actual image data are set. In this way, the RECT operation serves to fill out the bar code pattern. In the case of a vertically oriented bar code, the RECT operation tends to fill out the individual bars. In the case of a horizontally oriented bar code, the RECT operation tends to smear neighboring bars together. The important aspect of the RECT operation for defining the baseline is that it tends to sharpen the edge of the bar code profile.

After the window of data is subjected to the RECT operation, it is then subjected to an edgetracking operation, which locates an edge of the bar code profile. The edge so located is then used as the baseline for reading the bar code. In view of the different profiles resulting from application of the RECT operation to generally horizontal or generally vertical bar codes, separate horizontal and vertical edge tracking routines are used to define the baseline. As noted above, rectification of a vertical bar code tends to fill out the individual bars. If the bar code is too skewed from the vertical, however, the RECT operation may tend to bridge individual bars. This may cause a failure of the subsequent edge tracking routine to locate the baseline. The situation may be corrected by repeating the RECT operation with nibble-sized steps. The result of the nibble-wise operation is then passed on again to the edge tracking and decoding operations.

Illustrative rectification and edge tracking routines are disclosed in the C language program of the microfiche appendix.

To read the bar code, several adjacent scan lines in the midportion of the candidate bar code region and parallel to the baseline are averaged together. The averaged scan lines serve to eliminate misreads which could be caused by bridging between adjacent bars or undesired gaps within or at the edges of individual bars.

As indicated above, the invention is implemented in the specific embodiment described here in software for the microprocessor 15 of FIG. 1. A suitable computer program listing is given in the microfiche appendix. The program is written in portable C language and may be compiled by commercially available compilers to machine-executable form for the commonly available microprocessors.

The program code provided in the appendix was developed for application to pro number stickers bearing bar codes applied to bills of lading in the trucking industry. In that application it has been observed that in the past most pro number stickers were oriented within ±15 degrees of horizontal (although within that angular disposition they may be positioned upside-down). The remaining stickers were generally observed to be oriented within ±15 degrees of vertical (reading top to bottom or bottom to top). Pro number sticker oriented outside these ranges were rarely observed. Thus, the program code of the appendix is optimized for this specific application. Given the benefit of this disclosure, however, those of ordinary skill in the art will readily be able to adapt the methods disclosed here to other ranges of skewness or dominant bar code orientations.

While the above provides a full and complete disclosure of illustrative and preferred embodiments of the present invention, various modifications, alternate constructions, and equivalents may be employed without departing from the spirit and scope of the invention. For example, although the horizontal pattern of segments illustrated here was made up of a four-byte segment subdivided into two contiguous, non-overlapping two-byte segments, other patterns will occur to those skilled in the art given the benefit of this disclosure. For example, patterns may be devised including segments of other lengths, or other combinations or levels of subsegments, or even overlapping segments or subsegments. Therefore, the invention is not to be limited to the specific embodiments disclosed above, but is defined by the appended claims.

What is claimed is:

1. A method of automatically detecting a bar code or the like on a document from an image of the document, said bar code being disposed at an unknown position on the document and said image being represented by a pixel array, comprising the steps of;
   automatically locating a candidate bar code within a portion of said pixel array:
   defining a baseline of said candidate bar code; and
   decoding said bar code in the direction of said baseline.

2. The method of claim 1 wherein said locating step comprises the steps of:
   defining a pattern of segments within said pixel array;
   counting the number of transitions of said pixel array within each of said segments of said pattern; and
   comparing said numbers with predetermined ranges of transition numbers characteristic of bar code, whereby said pattern of segments overlies a candidate bar code if the corresponding numbers of transitions fall within said predetermined characteristic ranges.

3. The method of claim 2 wherein said pattern comprises a first linear segment and a plurality of subsegments thereof.

4. The method of claim 2 wherein said pattern of segments is defined only in selected rows of said array and only in selected portions of said selected rows, whereby said locating step is performed only in said selected portions and not performed in the non-selected rows and portions, so as to reduce the time to locate said candidate bar code within said pixel array.

5. The method of claim 2, wherein said pixel array is addressed in a predetermined direction, and said linear segments are composed of co-linear pixels in said predetermined direction.

6. The method of claim 5 further comprising the steps of:
   determining a pattern of segments skewed with respect to said predetermined direction; and
   performing said counting and comparing steps with respect to said skewed pattern, if said pattern of segments in said predetermined direction fails to locate a candidate bar code.

7. The method of claim 6, wherein said skewed pattern of segments is composed of blocks of pixels offset from one another perpendicular to said predetermined direction.

8. The method of claim 6, wherein said bar code includes a characteristic terminal symbol, further comprising the step of:
   when said counting and comparing steps with respect to said skewed pattern fail to locate a candidate bar code, subjecting successions of pixels from said pixel array in a direction generally perpendicular to said predetermined direction to state-transition analysis wherein said successions of pixels are compared with successions of states characteristic of said terminal symbol.

9. The method of claim 8, further comprising the step of:
   repeating said state-transition analysis with a succession of pixels skewed with respect to said perpendicular direction when said state-transition analysis along said generally perpendicular direction fails to locate a candidate bar code.

10. The method of claim 1 wherein said bar code includes a characteristic terminal symbol and said locating step comprises the step of:
    subjecting a succession of pixels from said pixel array to state-transition analysis wherein said succession of pixels is compared with a succession of states characteristic of said terminal symbol.

11. A method of systematically detecting a bar code or the like on a document from an image of the document, said image being represented by a pixel array addressed in a predetermined addressing direction and said bar code being disposed at an unknown position on said document and in an unknown orientation within a predetermined angular range with respect to said addressing direction, said method comprising the steps of:
    defining a first pattern of segments within said pixel array extending substantially in said predetermined addressing direction;
    counting the number of transitions of said pixel array within each of said segments of said pattern;
    comparing said numbers with predetermined ranges of transition numbers characteristic of bar codes, whereby said first pattern of segments overlies a candidate bar code if the corresponding numbers of transitions fall within said predetermined characteristic ranges;
    if said first pattern of segments fails to locate a candidate bar code, defining a second pattern of segments skewed with respect to said predetermined direction at an angle within said predetermined angular range;
    performing said counting and comparing steps with respect to said second pattern and
    if said second pattern of segments fails to locate a candidate bar code, defining further patterns of segments at successively greater angles of skew within said predetermined angular range, and performing said counting and comparing steps with respect to said further patterns of segments so as to locate a candidate bar code.

* * * * *